Nov. 19, 1968     C. E. WESTENSKOW     3,412,300
OPTIMUM SWITCHING OF A BANG-BANG SERVO
Filed June 1, 1965

INVENTOR.
CARL E. WESTENSKOW
BY

*Robert B. Crouch*

ATTORNEY

United States Patent Office 3,412,300
Patented Nov. 19, 1968

3,412,300
OPTIMUM SWITCHING OF A BANG-BANG SERVO
Carl E. Westenskow, San Jose, Calif., assignor to International Business Machines Corporation, Armonk, N.Y., a corporation of New York
Filed June 1, 1965, Ser. No. 460,231
3 Claims. (Cl. 318—18)

ABSTRACT OF THE DISCLOSURE

A bang-bang type of positioning servosystem for moving a load a discrete distance and employing a tachometer as the sole feedback means. A drive signal is supplied to an amplifier to drive the servomotor and accelerate the load. The drive signal saturates the amplifier to render the opposing tachometer feedback ineffectual. The velocity output of the tachometer is integrated until a predetermined voltage level is detected. Switching circuitry responds to the detection to block the drive signal and allows the velocity signal from the tachometer to decelerate the motor.

---

Figure 1:
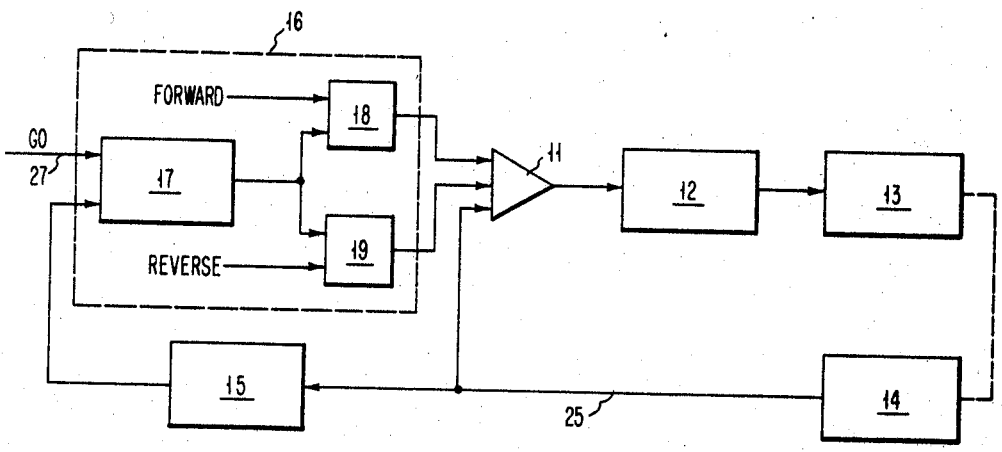

The present invention relates to a servo system and more particularly to means for switching a bang-bang servo at the optimum time.

It is well known to control an incremental stepping motor with a bang-bang servo system, i.e., one which employs maximum acceleration for approximately half the distance to be traveled and then maximum deceleration for the other half. With such a servo system, the critical factor is the point at which the motor drive is reversed. To determine this point with accuracy, a position transducer is often utilized. In such a system, the position transducer measures the travel of the motor and senses when it has moved approximately fifty percent of the desired increment. A signal from the position transducer is used to switch the servo from its acceleration phase to its deceleration phase. In systems which do not require precise accuracy, the expense of a position transducer can be avoided by making the system either time or velocity responsive. In a time responsive system, the signal which initiates the servo acceleration is also applied to a timing circuit, such as a single shot, etc., the period of which is selected to approximate the halfway point of the increment to be traveled. When the timing circuit times out, it switches the servo to its deceleration phase. A second timing circuit controls the period of deceleration and switches the servo off when it times out. In a velocity responsive system, a detector can be connected in the servo loop to sample the output of a tachometer. When the tachometer output indicates a given motor velocity, the servo is switched to its deceleration phase where it is under control of the tachometer. The time or velocity sensitive systems are less expensive than systems which incorporate a position transducer, but both are accurate for only one set of operating conditions and are highly susceptible to parameter variations.

An object of the present invention is to provide means for optimum switching of a bang-bang servo under various operating conditions without a position transducer.

The above object is realized in the present invention by provision of passive integration of the velocity signal from a tachometer to determine a switching level which corresponds to a particular distance moved, regardless of parameter variations. In the present invention, a tachometer is connected in the velocity loop and an integrator and a level detector are connected in the position loop of the system. The velocity signal from the tachometer is integrated to a predetermined voltage level corresponding to approximately one-half of the desired increment of movement. When this level is reached, the detector provides a reset signal for the servo control logic. The control logic interrupts the initial motor drive and allows the velocity signal from the tachometer to provide deceleration and damping for the motor.

The foregoing and other objects, features and advantages of the invention will be apparent from the following more particular description of a preferred embodiment of the invention, as illustrated in the accompanying drawings.

Figure 2:
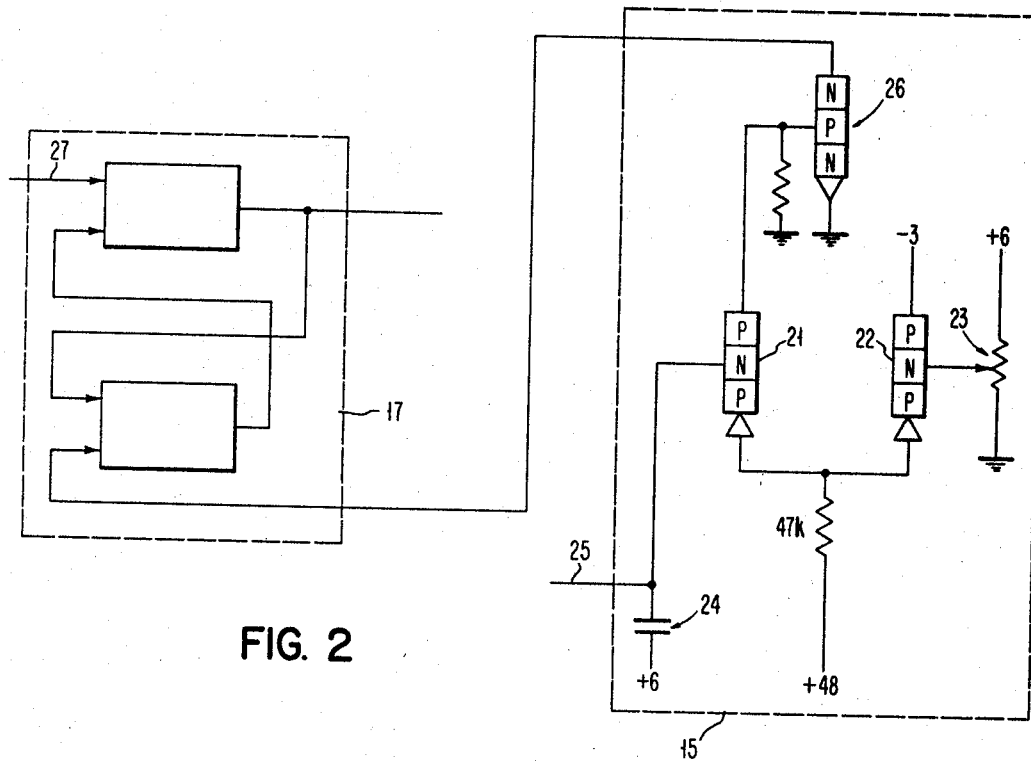

FIG. 1 is a schematic diagram of a servo circuit employing the present invention, and FIG. 2 is a circuit diagram of an integrator and level detector suitable for use in the circuit of FIG. 1.

Referring to the servo system of FIG. 1, the velocity loop includes a high gain D.C. amplifier 11, a power driver bridge 12, an incremental actuator 13, which may take the form of a voice coil motor for the purpose of stepping a magnetic transducer across a rotating recording disk, and a tachometer 14. The position loop includes the components of the velocity loop plus a halfway-point position indicator in the form of an integrator and detector 15, and servo control logic 16. The output of the tachometer is connected to the input of the integrator and detector as part of the position loop and also to the input of the amplifier 11 as part of the velocity loop. The purpose of the control logic is to generate an acceleration gate, either acceleration forward or acceleration reverse. The logic includes a latch 17 to switch the servo and a pair of AND gates 18 and 19 to determine the direction of actuator movement. The high gain D.C. amplifier 11 is a dual-sided summing amplifier, each side of which includes an emitter follower train driven by an inverting amplifier stage. The tachometer output and the acceleration gate are both applied to the base of the inverting amplifier stage. The power driver 12 includes four transistors connected in a bridge. The bridge allows current from a single power supply (48 volts in this example) to flow through the motor terminals in either direction, depending upon which leg of the bridge is energized. The actuator 13 is connected across the power driver bridge. The tachometer 14 is a linear velocity transducer whose differential signal is applied to a pair of cascaded emitter follower amplifiers. Each side of the tachometer generates approximately 250 millivolts per inch per second.

Referring to FIG. 2, the halfway point indicator is comprised of an integrator and level detector circuit. The level detector includes a pair of PNP transistors 21 and 22 connected as a switch. A potentiometer 23 is connected to the base of transistor 22. A capacitor 24 is connected between a +6 voltage and the base of transistor 21, and the tachometer velocity signal is applied between the capacitor and the switch on line 25. The output of the switch is connected to the base of an inverter transistor 26 which is connected in series with the latch.

In the operation of the servo of FIG. 1, a "go pulse" is delivered to the control logic on line 27. The control logic produces a drive reference signal, either forward or reverse, to the summing junction of the high gain D.C. amplifier 11. The strength of this signal is such that the velocity signal from the tachometer is swamped and the high gain D.C. amplifier causes the power driver bridge to apply full power to the actuator. While the actuator is accelerating, the halfway point position indicator operates on (time-integrates) the tachometer signal. This computed position of the actuator is then compared to an accurately determined reference which corresponds to approximately half of the desired increment of movement. When comparison is achieved showing that the actuator has moved approximately half of the distance of the incremental step, a signal is transmitted to the latch 17 which causes the drive reference signal to be interrupted. Up to this point in time, the actuator has been accelerated to its maximum velocity, and the tachometer voltage has increased in amplitude. As soon as the drive reference is removed, the tachometer velocity signal becomes the only quantity controlling the actuator and this signal now commands the actuator to stop. Since the tachometer signal is relatively large, and is applied to the high gain D.C. amplifier, the power driver bridge applies maximum power to the actuator in a decelerating polarity. The decelerating drive is applied until the velocity of the actuator is extremely small. Since the same magnitude of force is developed by the actuator to accelerate and decelerate, and since the polarity of the drive changes from accelerate to decelerate at the halfway point, the actuator will come to rest very near the desired incremental step distance. In order to achieve high accuracy, a detenting mechanism, such as a rack and tooth, may be engaged to provide precise final positioning.

In the operation of the circuit of FIG. 2, the tachometer signal applied on line 25 is integrated and compared to a preset voltage level which corresponds to one-half the increment to be traveled. This voltage level is predetermined and is set on the potentiometer 23. The voltage on capacitor 24 is compared to the voltage at the base of transistor 22. The voltage at the base of transistor 21 starts at +6 volts and is integrated downward to the voltage at the base of transistor 22. Hence, the voltage at the base of transistor 22 determines the length of travel of each step. Additional circuitry (not shown) is provided to reset the voltage across the capacitor 24 to zero after each integration cycle. By maintaining a constant potential on potentiometer 23 the actuator will produce a constant increment of movement. However, the level detector can be programmed to produce random movement of the actuator by addressing the potentiometer with different potentials corresponding to different sizes of steps in the actuator. By means of a relay tree, for instance, the potential applied to the potentiometer can be varied to produce random size steps of the actuator.

In addition to avoiding the expense of a position transducer, the present invention has the further advantage that it focuses accuracy requirements in the feedback path, i.e., the tachometer, thus allowing the tolerances of the components in the forward path of the servo loop to be relaxed. Since accuracy within close tolerances can be obtained in a tachometer much easier and more economically than in the combination of the high gain D.C. amplifier, power-driver bridge and actuator, a significant cost saving is obtained while the overall system accuracy is maintained.

While the invention has been particularly shown and described with reference to a preferred embodiment thereof, it will be understood by those skilled in the art that various changes in the form and details may be made therein without departing from the spirit and scope of the invention.

What is claimed is:
1. In a bang-bang servosystem for moving a load including a high gain D.C. amplifier, a power bridge driver and an actuator connected in series in the forward path and a tachometer in the feedback path to said D.C. amplifier, the improvement thereto for causing said servosystem to move said load a discrete distance from rest at an initial point comprising:
  input means supplying an acceleration signal to said servosystem;
  integrating means additionally connected to said tachometer for integrating the output of said tachometer; and
  switching means for initially supplying said acceleration signal to said D.C. amplifier, saturating said amplifier so said tachometer feedback is an ineffectual input thereto, said switching means being responsive to said integrating means reaching a predetermined level to remove said acceleration signal from said D.C. amplifier so said tachometer feedback effectually comprises the deceleration input to said D.C. amplifier to decelerate said load to rest, whereby said predetermined level determines the distance from said initial point that said servosystem decelerates said load and thereby determines said discrete distance traveled by said load.

2. The bang-bang servosystem of claim 1 including:
  level detection means for detecting said integration means reaching a predetermined voltage level; and
  wherein said switching means is responsive to said detection by said level detection means to remove said acceleration signal from said D.C. amplifier.

3. The bang-bang servosystem of claim 2 wherein:
  said level detection means is made adjustable to allow adjustment of said predetermined voltage level and thereby said discrete distance traveled by said load.

References Cited

UNITED STATES PATENTS

| | | |
|---|---|---|
| 2,994,856 | 8/1961 | Dickinson. |
| 3,093,776 | 6/1963 | Bird et al. |
| 3,183,420 | 5/1965 | Westenskow. |
| 3,209,338 | 9/1965 | Romvari _____ 340—174 |
| 3,241,015 | 3/1966 | Allen. |
| 3,252,101 | 5/1966 | Gorbatenko. |
| 3,122,687 | 2/1964 | Romvari _____ 318 |

ORIS L. RADER, *Primary Examiner.*

THOMAS E. LYNCH, *Assistant Examiner.*